March 14, 1967    E. N. HALL    3,308,767
TRANSPORTATION DEVICE UTILIZING HYDROSTATIC BEARINGS
Filed Dec. 22, 1964    2 Sheets-Sheet 2
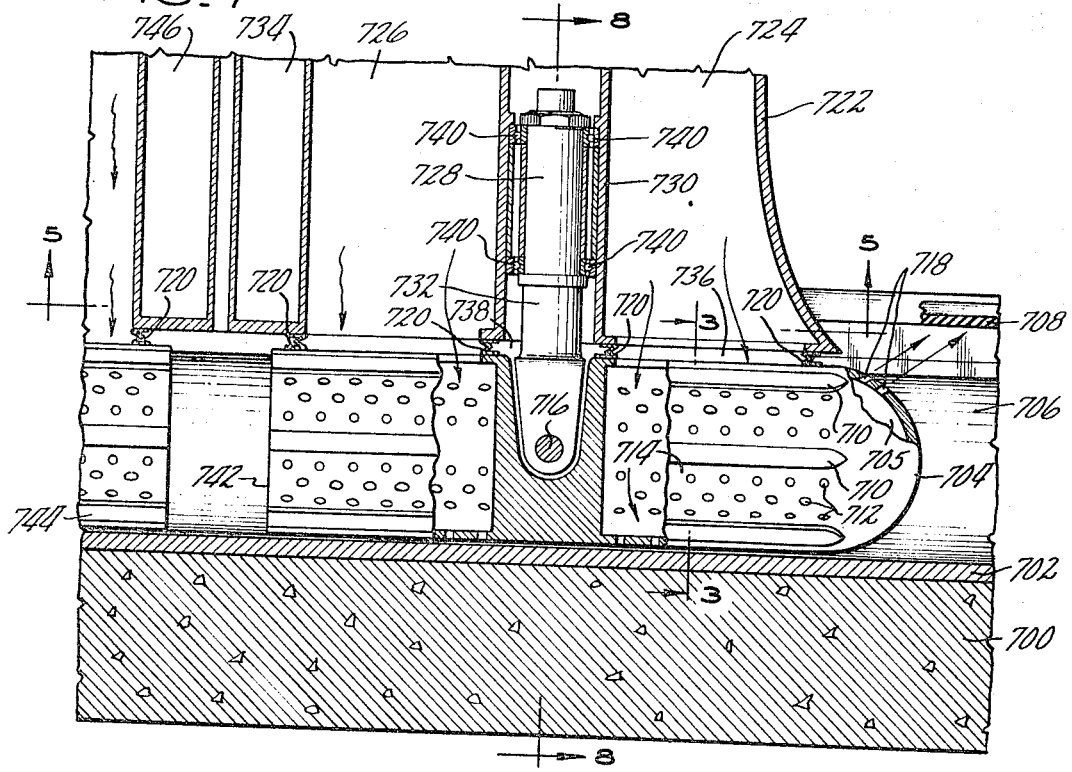
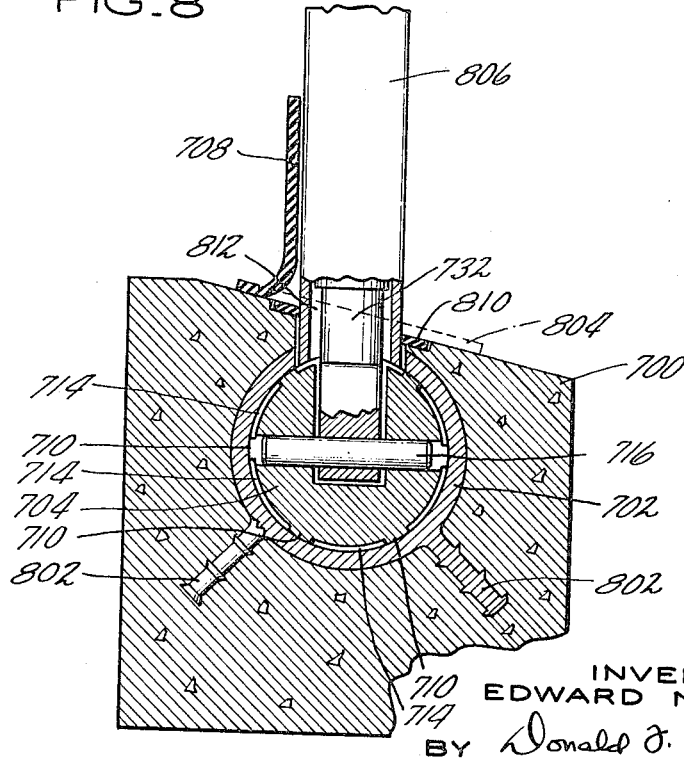
INVENTOR
EDWARD N. HALL
BY Donald J. Bradley
ATTORNEY

# United States Patent Office 3,308,767
Patented Mar. 14, 1967

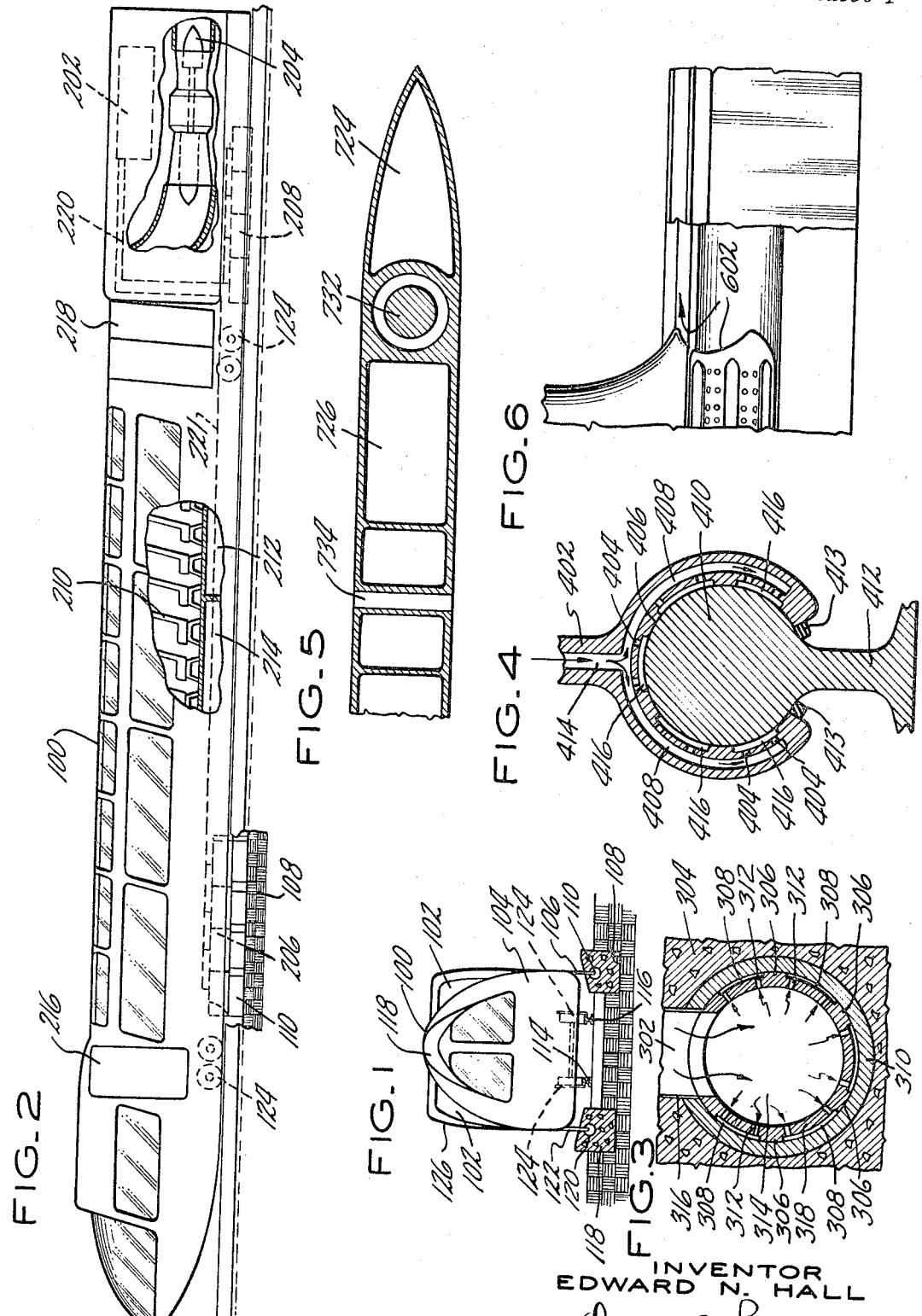

3,308,767
TRANSPORTATION DEVICE UTILIZING HYDROSTATIC BEARINGS
Edward N. Hall, Bloomfield, Conn., assignor to United Aircraft Corporation, East Hartford, Conn., a corporation of Delaware
Filed Dec. 22, 1964, Ser. No. 420,279
7 Claims. (Cl. 104—134)

This invention relates to a high speed interurban transportation system. More specifically it relates to a high speed train using hydrostatic bearings to reduce friction and provide omnidirectional restraint for purposes of stability and guidance.

It has become apparent that present transportation devices such as cars, buses and conventional trains inadequately cope with interurban transportation problems. These conventional transportation devices show a serious lack of capability in coping with the population growth and the corresponding need for larger urban business districts.

For instance, an urban community that supports a population of a radius of say 50 miles usually has the main business activity in the center with the surrounding territory used for residential purposes. A major obstacle to the growth of the business center is the adjacent and surrounding residential communities which choke expansion of the center. Furthermore, from the viewpoint of travel time the business center is relatively inaccessible where large urban areas intervene. A need, therefore, has arisen to facilitate the access to the business center from further outlying residential areas and at the same time provide fast transportation between different urban communities.

It is therefore an object of this invention to provide an ultra fast subsonic transportation system.

The need for fast transportation must take existing facilities into account in order to limit costs and construction problems. It is thus another object of this invention to provide an ultra fast subsonic transportation system by using existing railroad facilities.

Since the railroads are oriented at wheel-type transportation and such systems have limited speed capabilities, it is another object of this invention to provide hydrostatic bearings to support a train at these high speeds.

At local switching centers, near railroad stations the need for slow speeds as well as the multiple crossing points would tend to make conventional wheels more economical. It is thus still another object of this invention to provide a hybrid high-speed subsonic transportation system using conventional wheels as well as hydrostatic supports.

Competitors of the rail-type transportation are the buses and cars which with emphasis on the latter have the advantage of door-to-door transportation. Since rail transportation using existing facilities can bring one within most urban centers but not to the actual point of destination, it is necessary to increase the speed of the rail system sufficiently high so that it becomes competitive in its service with other modes of transportation. Competitive speeds which vary with different communities may have to exceed 200 miles per hour and reach levels as high as 600 m.p.h. The instability at such high speeds would tend to disrupt the conventional rail support system and lift the vehicle off the tracks. It is thus another object of this invention to provide a rail vehicle support system whose vertical stability would not be disturbed at ultra-high subsonic speeds.

One requirement for high speed transportation is that the friction forces between the vehicle and the ground be minimized. An air-bearing support is a convenient method of reducing this friction. One conventional system, for instance, supports the vehicle on a V-shaped track and air is blown at variable pressures between the vehicle and this track. The disadvantage of such a system is that the absence of vertical restraints may result in track lift-off at very high speeds. Other systems show the vehicle completely inserted in a tube and supporting the vehicle within the tube entirely upon a fluid film, but this system cannot be adapted to conventional railroad tracks. Furthermore, the efficiency of these conventional air-bearing transportation systems leaves much to be desired and needs improvement. Such improvement can be obtained by utilizing grooves in the bearing surface facing the supporting device. Further efficiency improvement results by enveloping the bearing about the support or the support about the bearing. Such structure has the additional advantage of providing vertical restraint. It is thus still another object of this invention to provide an efficient and low friction fluid bearing having grooves and lands distributed along its supporting surface.

These and other objects and features of the present invention will appear from the description of several embodiments described in connection with the drawings in which:

FIG. 1 shows the vehicle of this invention in front elevation.

FIG. 2 shows the vehicle in side elevation.

FIG. 3 shows a section along line 3—3 in FIG. 7.

FIG. 4 is a partial sectional view of an alternate bearing-support system in which the supporting device is enveloped by the bearing.

FIG. 5 indicates a sectional view along the line 5—5 in FIG. 7.

FIG. 6 shows a variation in the front design of the bearing of FIG. 7.

FIG. 7 shows a sectional view in side elevation of the bearing inserted in a tubular slot.

FIG. 8 is a section taken along the line 8—8 of FIG. 7 including other details related to the tubular support and its connection to the ground.

FIG. 1 shows the vehicle 100 supported by two rows of fluid bearings 110 and 120 via struts 106 and 122. The vehicle has a fan intake 126, an air condition intake 118 and a compressor inlet 102. The compressor indicated as 202 in FIG. 2 is a conventional device for providing pressurized air to the fluid bearings 110 and 120. The rails 116 and 114 correspond to the conventional double-rail transportation system and may support the retracted wheels 124. The fluid bearing rail supports are shown as 108 and 118 and are located at the outside of the conventional rails 114 and 116.

In FIG. 2 the vehicle 100 is shown to contain seats 210, baggage compartment 214, fuel compartment 212, doors 216, 218, and a propulsion system 204. Two rows of fluid bearings 206 and 208 are shown supported by the rail 108. In addition, the retracted conventional rail wheels 124 are shown. The fluid ducts 220, 221 lead the fluid compressed by compressor 202 to the fluid bearings 206 and 208.

As seen in FIG. 3, a concrete mounting 304 contains a tube type rail 310 which is made of a smoothly surfaced metal. The rail 310 has a slot 302 cut on top through which the fluid bearing 318 may support the vehicle via a strut of the type shown as 806 in FIG. 8. The fluid bearing 318 has pockets 308 which are formed between lands 306, while orifices 312 interconnect the chamber 314 with the pockets 308. The clearance 316 formed between the strut 806 and the wall of 304 permits fluid to flow from chamber 314 through orifices 312 to grooves 308 and then along the space between the land 306 and the tubular internal wall of rail 310 up through clearance 316 to the outside. Since it is always desirable to minimize this clearance and provide some sort of sealing means to reduce escaping fluid through this area in the slot, a seal of the type shown in FIG. 8 as 810 is used. This seal is attached to the strut 806 and moves with the fluid bearing.

As seen in FIG. 7, the concrete support 700 carries the tubular rail 702 which in turn supports the bearing 704. Bearing 704 contains recessed surfaces or grooves 714 having orifices 712. The grooves are formed by lands 710. The slot 302 in the upper side of rail 702 is covered by a running flexible seal 708 which is lifted to permit passage of the bearing 704. The sealing strip 708 prevents foreign material from entering tubular rail 702. FIG. 8 shows the seal 708 in the lift position. Chamber 705 inside bearing 704 communicates with the orifices 712. The chamber 705 is also shown connected to orifice 718 which is directed upwardly at an angle towards seal 708 so as to eject a jet of air while the bearing is traversing the tube and hence to deflect the seal upwardly to make room for the bearing 704. In FIG. 6 it is recognized that the air pressure encountered within the tube 704 is sufficiently strong to be used in lifting the seal 708 as the bearing 704 traverses the tube 702 at high subsonic speeds. To facilitate the upward momentum required to lift the seal 708, the bearing 704 is shown to have a concave surface 602 for scooping the air within the rail 702 and urging it towards the seal.

The chamber 705 in bearing 704 communicates with chamber 724 in duct 722. The duct 722 is firmly attached to the main supporting strut 732. The strut 732 in turn is pivotably connected to bearing 704 by a pin 716. The chamber 736 between duct 722 and bearing 704 is closed off by a flexible seal 720. The main supporting strut 732 is threaded to a bearing member 740. The bearing 740 and pin 716 combine to form a universal joint.

As seen in both FIGS. 5 and 8, the bearing 704 terminates at an aft wall 742 and spaced rearwardly therefrom is a second bearing 744. The bearing 744 is mounted to the vehicle in a manner similar to bearing 704 and the bearings are interconnected by a flexible coupling 734, 746. In this manner the bearings can move relative to each other in articulate fashion.

As seen in FIG. 8, the attachments of the rail 702 to the ground 700 is by means of radially extending rods 802 which may be embedded in the ground directly or by means of concrete pads. The customary way of attaching the rail 702 to the right-of-way by cross-ties and spikes is inadequate for high-speed trains because of the unusual lateral and vertical loads encountered at these high speeds.

The rail 702 is internally smoothly surfaced and has a slot 302 which extends along the rail as described in relation to FIG. 3. The slot ordinarily is covered by a shield 708, which is shown in the sealed position 804 in FIG. 8. When the bearing 704 traverses the slot, the seal 804 is lifted. The chamber 812 is surrounded by a shield 810 which extends along the length of the bearing 704. The seal 810 minimizes the leakage from the grooves 714 which flows past the land 710 into the chamber 812. This leakage ordinarily would escape outwardly through the slot. This mechanical seal 810 can be replaced by a fluid curtain which flows at a sufficiently high speed to provide a barrier between the ambient air on the outside and the film of fluid between the bearing 704 and the tube 702. It must be realized that the bearing 704 when it is supported by fluid film is free to float thus providing a hydrostatic support. This means that the tube 702 is not always concentric with the bearing 704. The eccentricity will vary accordingly to the loading of the vehicle and hence the bearing clearance will also vary. Under these conditions, the seal 810 will minimize the loss of fluid.

An alternate inverse bearing arrangement to that shown in FIG. 3 is shown in FIG. 4. In this case the tubular rail 702 of FIG. 8 is replaced with a solid rail 410 supported by the solid segment 412. The support 412 may be long or short depending on the application provided, however, that the bearing 402 which envelops the supporting rail 410 can surround it sufficiently to obtain vertical restraint from the rail 410. The vertical fluid passage 414 communicates with the chamber 408 which in turn communicates via the orifices 404 with the grooves 416 formed by lands 406. This arrangement is thus in essence the inverse of the tubular supporting system shown in the other figures. An advantage of this support is the elimination of the slot and seal used in the tubular rail.

The bearing configuration in FIGS. 4 and 7 show positive vertical restraint provided by the tube 702 and the bearing 402. This is necessary because at high subsonic speeds the wind effects on the vehicle must be taken into consideration and gravity cannot be relied upon to keep the vehicle on its rails.

In the operation of the hydrostatic bearing, flotation of the vehicle is accomplished with the compressed air from the compressor 202. In an alternate arrangement the compressed air could be bled from the gas turbine propulsion devices from which high pressure gas is obtainable. The compressed air flows through suitable ducts 220 and 218 to the individual bearings via the struts 106 and 122. A series of bearings will be required to provide sufficient supporting areas and in view of the clearances between the bearings and the supporting tubes no rigid interconnections between adjacent bearings will be possible. Articulating adjacent bearings by the flexible interconnections 734, however, will not create adverse effects and in fact improves the ability of the supporting system to withstand rail subsidences and rail alignment errors.

The design fundamentals involved in the application of air bearings indicate the sizing for an acceptable system. Suppose the vehicle 100 has a gross weight of 75,000 lbs. and a 235 p.s.i.a. gas pressure source is available for flotation of the hydrostatic bearings. The permissible bearing loads vary as a function of the bearing to cylinder clearance. For a reasonable 0.030 inch clearance and a design pressure of 235 p.s.i.a., sixteen bearings having an 11 inch diameter and 33 inches long would support the vehicle. The design includes a projected actual total bearing area of 5600 square inches. The mass flow requirements can be computed using the formula of $$\dot{\omega} = K_1 A + K_2 \left(\frac{C-.001}{0.0005}\right) A$$

where $\dot{\omega}$ = mass flow of gas in lb./sec.
$K_1$ = constant = $9.9 \times 10^{-4}$
$K_2$ = constant = $0.842 \times 10^{-4}$
$C$ = nominal radial clearance in inches The flow involved for the above example is about 33 lbs. of gas per second and falls well within the capability of conventional compressors and gas turbine engines.

The gas bearing 704 accepts the gas from the ducts 724 and transmits it to the longitudinal grooves 714. These grooves are identical in geometry and spaced symmetrically around the circumference of the bearing.

The grooves may be rectangular in shape or some other convenient size and may run skewed or circumferentially over the bearing surface. The radial steady state load applied by the heavy vehicle through the strut 732 to the bearing 704 causes displacement of the bearing to an eccentric position in relation to the cylinder 702. The extent of the displacement is controlled by the self-adjusting pressure distribution within the grooves.

The gas accepted by the bearing 704 and transmitted onto the recesses or grooves expands axially out between the bearing and the cylinder. With the occurrence of a radial load the reduction in radial clearance on one side of the bearing traps the fluid in several grooves restricting the flow and causing these groove pressures to increase. The pressure increase tends to resist the load.

On the side where the radial clearance is increased there is a decrease in pressure. The tendency of the device then shows its self-adjusting capability by balancing the pressure differential over the bearing area.

A virtue of this invention is portrayed by this self-adjusting capability in that at very high subsonic speeds metal-to-metal contacts are avoided in spite of geometric irregularities and heavy radial loads.

The use of the pockets and lands furthermore maximizes the stiffness of the gas bearing and improves the radial load carrying capability of the bearing.

Provided that the eccentricity ratio, i.e., the ratio established between the radii of the bearing 704 to that of the tube 702 is less than unity; a finite film of gaseous lubricant exists between the bearing and the cylinder at all times.

Although a smooth bearing surface, i.e., not grooved, would react in a similar manner the grooves permit higher radial bearing loads for a given gas pressure at the orifices. This effect has been analytically and experimentally substantiated.

Although the invention has been described and illustrated in detail, it is to be clearly understood that the same is by way of illustration and example only and is not to be taken by way of limitation of the scope of the invention.

I claim:

1. A hydrostatic support for a vehicle on a rail transportation system comprising:
   a source of fluid under pressure carried by said vehicle,
   a plurality of substantially parallel spaced rails having tubular cross sections and longitudinal slots,
   a plurality of fluid bearings mounted within said rails and having orifices distributed along the bearing surface facing said rail,
   means connected to said bearings through said slot for supporting said vehicle, and
   means for applying said fluid pressure source to said orifices for issuing fluid therefrom and producing a film of fluid between said bearings and said rails.

2. A hydrostatic support for a vehicle on a rail transportation system comprising:
   a source of fluid under pressure carried by said vehicle,
   a plurality of substantially parallel spaced rails having tubular cross sections and longitudinal slots,
   a plurality of fluid bearings adapted to slide within said rails,
   means for connecting said bearings through said slot to said vehicle,
   said bearings having a plurality of longitudinal grooves distributed over the surfaces of said bearings and substantially parallel to the sliding direction of said bearings,
   a plurality of interconnected orifices distributed within said grooves, and
   means for applying said fluid pressure source to said orifice for issuing fluid therefrom and producing a film of fluid between said bearing and said rail.

3. A hydrostatic support for a vehicle on a rail transportation system comprising:
   a source of fluid under pressure carried by said vehicle,
   a plurality of substantially parallel spaced rails having tubular cross sections and longitudinal slots,
   a plurality of fluid bearings adapted to slide within said rails,
   means for connecting said bearings through said slot to said vehicle,
   said bearings having a plurality of longitudinal grooves distributed over the surfaces of said bearings and substantially parallel to the sliding direction of said bearings,
   a plurality of interconnected orifices distributed within said grooves,
   means for applying said fluid pressure source to said orifice for issuing fluid therefrom and producing a film of fluid between said bearing and said rail, and
   sealing means connected to said bearing for reducing the escape of fluid from said fluid film through said slot along a peripheral path formed by the intersection of said bearing and said slot.

4. A hydrostatic support for a vehicle on a rail transportation system comprising:
   a source of fluid under pressure carried by said vehicle,
   a plurality of substantially parallel spaced rails having tubular cross sections and longitudinal slots,
   a plurality of fluid bearings adapted to slide within said rails,
   means for connecting said bearings through said slot to said vehicle,
   said bearings having a plurality of grooves distributed over the surfaces of said bearings,
   a plurality of interconnected orifices distributed within said grooves, and
   means for applying said fluid pressure source to said orifice for issuing fluid therefrom and producing a film of fluid between said bearing and said rail.

5. A hydrostatic support for a vehicle on a rail transportation system comprising:
   a source of fluid under pressure carried by said vehicle,
   a plurality of substantially parallel spaced rails having a tubular cross section and a longitudinal slot,
   a flexible seal strip adapted to cover said slot and having first and second longitudinal edges, said first edge firmly attached to one side of said slot and said other edge normally disposed along the other side of said slot,
   a plurality of flexibly interconnected fluid bearings adapted to slide within said rails,
   said bearings having a plurality of grooves distributed over the surface of said bearings, said bearings further having chambers and a plurality of interconnected orifices distributed within said grooves and communicating with said bearing chambers,
   means for connecting said bearings through said slot to said vehicle for supporting said vehicle,
   means for applying said fluid pressure source to said bearing chambers for issuing fluid from said orifices and producing a film of fluid between said bearing and said rails, and
   means connected to the front bearings for lifting said seal in advance of said vehicle.

6. A hydrostatic support system as in claim 5 where said seal lifting means comprises:
   a passageway communicating with said bearing chamber and arranged to issue a jet of said fluid forwardly and upwardly towards said seal.

7. A hydrostatic support system as in claim 5 where said seal lifting means comprises:
   a front bearing having a concave shape adapted to steer the gas encountered in said rail forwardly and upwardly towards said seal as said bearing traverses said rail.

References Cited by the Examiner

UNITED STATES PATENTS

| | | | |
|---|---|---|---|
| 409,769 | 8/1889 | Bodefeld | 104—161 |
| 2,805,898 | 9/1957 | Willis. | |
| 3,013,505 | 12/1961 | Burke | 104—134 |
| 3,181,636 | 5/1965 | Cockerell | 180—7 |
| 3,232,366 | 2/1966 | Cockerell | 104—134 X |

OTHER REFERENCES

Haynes, Alex L., and Jay, David J.: Sliding on Air, Society of Automotive Engineers, Inc., 485 Lexington Ave., New York 17, N.Y. #133B, Preprint of paper given at SAE Annual Meeting Jan. 11–15, 1960. (Copy in Group 450.)

ARTHUR L. LA POINT, *Primary Examiner.*

J. E. BABER, *Assistant Examiner.*